US009637827B2

(12) United States Patent
Galande et al.

(10) Patent No.: US 9,637,827 B2
(45) Date of Patent: May 2, 2017

(54) METHODS OF PREVENTING CORROSION OF SURFACES BY APPLICATION OF ENERGY STORAGE-CONVERSION DEVICES

(71) Applicant: William Marsh Rice University, Houston, TX (US)

(72) Inventors: Charudatta Galande, Houston, TX (US); Neelam Singh, Houston, TX (US); Suman Khatiwada, Houston, TX (US); Pulickel M. Ajayan, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 141 days.

(21) Appl. No.: 14/504,350

(22) Filed: Oct. 1, 2014

(65) Prior Publication Data

US 2015/0090607 A1    Apr. 2, 2015

Related U.S. Application Data

(60) Provisional application No. 61/885,201, filed on Oct. 1, 2013.

(51) Int. Cl.
*C23F 13/02* (2006.01)
*C23F 13/06* (2006.01)

(52) U.S. Cl.
CPC .................... *C23F 13/06* (2013.01)

(58) Field of Classification Search
CPC ...... C23F 13/02; C23F 13/06; C23F 2213/20; C23F 2213/21; C23F 2213/30–2213/32; H01M 10/0525; H01M 4/13
(Continued)

(56) References Cited

U.S. PATENT DOCUMENTS 5,366,604 A * 11/1994 Stilley ................. C23F 13/06
136/291
6,926,997 B2   8/2005 Guidotti et al.
(Continued)

FOREIGN PATENT DOCUMENTS

| EP | 1775462 A2 * | 4/2007 | ............ C23F 13/04 |
| EP | 2270909 A1 | 1/2011 | |
| WO | WO-2014007866 A2 | 1/2014 | |

OTHER PUBLICATIONS

International Search Report and Written Opinion for PCT/US2013/032394, mailed Jan. 10, 2014.
(Continued)

*Primary Examiner* — Luan Van
*Assistant Examiner* — Alexander W Keeling
(74) *Attorney, Agent, or Firm* — Winstead PC

(57) ABSTRACT

The present disclosure pertains to methods of protecting a surface (e.g., a metal surface) from corrosion by conformably attaching a hybrid device comprising at least one multilayer energy storage device and at least one energy conversion device. In some embodiments, the multilayer energy storage device is formed by the following steps: (1) applying a non-solid negative electrode current collector composition above the surface to form an negative electrode current collector layer above the surface; (2) applying a non-solid negative electrode composition above the negative electrode current collector layer to form an negative electrode layer above the negative electrode current collector layer; (3) applying a non-solid electrically insulating composition above the negative electrode layer to form an electrically insulating layer above the negative electrode layer; (4) applying a non-solid positive electrode composition above the electrically insulating layer to form a positive electrode layer above the electrically insulating layer; and (5) applying a non-solid positive electrode current collector
(Continued)

composition above the positive electrode layer to form a positive electrode current collector layer above the positive electrode layer.

31 Claims, 13 Drawing Sheets

(58) Field of Classification Search
USPC ............... 204/196.01, 196.1–196.26, 196.27
See application file for complete search history.

(56) References Cited

U.S. PATENT DOCUMENTS

| | | | |
|---|---|---|---|
| 8,877,388 B1* | 11/2014 | Ihlefeld | ............. H01M 10/0562 |
| | | | 429/304 |
| 2002/0110733 A1 | 8/2002 | Johnson | |
| 2003/0038610 A1* | 2/2003 | Munshi | ..................... H02J 7/35 |
| | | | 320/101 |
| 2008/0090138 A1 | 4/2008 | Vu et al. | |
| 2008/0138696 A1 | 6/2008 | Bartling | |
| 2008/0190841 A1 | 8/2008 | Pascaly et al. | |
| 2009/0070989 A1 | 3/2009 | Pozin et al. | |
| 2010/0330425 A1 | 12/2010 | Lopatin et al. | |
| 2011/0104571 A1 | 5/2011 | Zhamu et al. | |
| 2011/0143018 A1 | 6/2011 | Peng et al. | |
| 2011/0165459 A1 | 7/2011 | Halalay et al. | |
| 2011/0256450 A1 | 10/2011 | Campbell et al. | |
| 2011/0274850 A1 | 11/2011 | Yang et al. | |
| 2012/0009331 A1 | 1/2012 | Kwon et al. | |
| 2012/0015232 A1 | 1/2012 | Teshima et al. | |
| 2012/0018312 A1* | 1/2012 | Yamamoto | ............... C09D 5/24 |
| | | | 205/724 |
| 2012/0045694 A1 | 2/2012 | Park et al. | |
| 2012/0048729 A1 | 3/2012 | Mikhaylik et al. | |
| 2014/0011069 A1* | 1/2014 | Zhou | ................... H01M 10/058 |
| | | | 429/149 |
| 2015/0027615 A1 | 1/2015 | Singh et al. | |
| 2015/0104714 A1 | 4/2015 | Galande et al. | |

OTHER PUBLICATIONS

International Preliminary Report on Patentability for PCT/US2013/032394, mailed Sep. 25, 2014.

Singh et al., Paintable Battery, Scientific Reports 2, Article No. 481, 2012.

Singh, Fabrication of Li-ion batteries by multi-step spray painting, poster presented at the IDTechx Energy harvesting and Storage Conference, Nov. 7-8, 2012.

Singh, Fabrication of Li-ion batteries by multi-step spray painting, Power Point slides presented at the IDTechx Energy harvesting and Storage Conference, Nov. 7-8, 2012.

Singh, Paintable Li-ion Batteries, Power Point slides presented to Applied Materials on Jul. 6, 2012 (also presented to the Thin Film Users Group in Sep. 2012).

Historic Congressional Study: Corrosion Costs and Preventative Strategies in the United States, a Supplement to Materials Performance, NACE International, Houston TX (Jul. 2002).

Hu et al., Stretchable, Porous, and Conductive Energy Textiles. *Nano Letters* 10, 708 (2010).

Liu et al., Flexible, Solid Electrolyte-Based Lithium Battery Composed of LiFePO4 Cathode and Li4Ti5O12 Anode for Applications in Smart Textiles. Journal of the Electrochemical Society 159, A349 (2012).

Pushparaj et al., Flexible energy storage devices based on nanocomposite paper. Proceedings of the National Academy of Sciences of the United States of America 104, 13574 (2007).

Yang et al., Transparent lithium-ion batteries. *Proceedings of the National Academy of Sciences of the United States of America* 108, 13013 (2011).

Liangbing et al., Thin, Flexible Secondary Li-Ion Paper Batteries, ACS Nano, 2010, 4 (10), pp. 5843-5848.

Du Pasquier et al., Plastic PVDF-HFP electrolyte laminates prepared by a phase-inversion process, Solid State Ionics 135, 1-4 (2000).

Tarascon et al., Performance of Bellcore's plastic rechargeable Li-ion batteries, *Solid State Ionics*, 86-88, 49-54 (1996).

Nishide et al., Toward Flexible Batteries. *Science* 319, 737 (2008).

Hu et al., Thin, Flexible Secondary Li-Ion Paper Batteries. *Acs Nano* 4, 5843 (2010).

Jones et al., A Thin-Film Solid-State Microbattery. *Journal of Power Sources* 44, 505 (1993).

Harb et al., Microbatteries for self-sustained hybrid micropower supplies. *Journal of Power Sources* 104, 46 (2002).

Leonov et al., Wearable electronics self-powered by using human body heat: The state of the art and the perspective. *Journal of Renewable and Sustainable Energy* 1, (2009).

Scrosati et al., Lithium batteries: Status, prospects and future. *Journal of Power Sources* 195, 2419 (2010).

Kiebele et al., Carbon nanotube based battery architecture. *Applied Physics Letters* 91, (2007).

Zhang et al., Microporous gel electrolyte Li-ion battery. *Journal of Power Sources* 125, 114 (2004).

Genovese et al., Sun-Believable Solar Paint. A Transformative One-Step Approach for Designing Nanocrystalline Solar Cells. *Acs Nano* 6, 865 (2011).

Ahn et al., Development of high capacity, high rate lithium ion batteries utilizing metal fiber conductive additives. *Journal of Power Sources* 81-82, 896 (1999).

* cited by examiner

METHODS OF PREVENTING CORROSION OF SURFACES BY APPLICATION OF ENERGY STORAGE-CONVERSION DEVICES

CROSS-REFERENCE TO RELATED APPLICATIONS

This application claims priority to U.S. Provisional Patent Application No. 61/885,201, filed on Oct. 1, 2013. This application is also related to PCT/US2013/032394, entitled "Methods of Making Multilayer Energy Storage Devices", filed on Mar. 15, 2013. The entirety of each of the aforementioned applications is incorporated herein by reference.

BACKGROUND

The surfaces of many metallic objects can become vulnerable to corrosion in various environments. Current methods to protect such objects from corrosion suffer from various limitations, including cost, effectiveness, maintenance, and ease of use. Therefore, a need exists for improved methods and compositions for constantly protecting the surface of metallic objects from corrosion in various environments without significant human intervention.

BRIEF SUMMARY

In some embodiments, the present disclosure pertains to methods of protecting a surface (e.g., a metal surface) from corrosion by forming a multilayer energy storage device (e.g., a lithium ion battery) on the surface. In some embodiments, the multilayer energy storage device is formed on the surface by the following steps: (1) applying a non-solid negative electrode current collector composition above the surface to form a negative electrode current collector layer above the surface; (2) applying a non-solid negative electrode composition above the negative electrode current collector layer to form a negative electrode layer above the negative electrode current collector layer; (3) applying a non-solid electrically insulating composition above the negative electrode layer to form an electrically insulating layer above the negative electrode layer; (4) applying a non-solid positive electrode composition above the electrically insulating layer to form a positive electrode layer above the electrically insulating layer; and (5) applying a non-solid positive electrode current collector composition above the positive electrode layer to form a positive electrode current collector layer above the positive electrode layer.

In additional embodiments, the present dislcosure pertains to methods of protecting a surface from corrosion by (a) forming a multilayer energy storage device; and (b) adhering the multilayer energy storage device onto the surface. In some embodiments, the multilayer energy storage device is formed by the following steps: (i) applying a non-solid negative electrode composition above a flexible foil that can function as a negative electrode current collector layer (e.g., a copper foil or tape), where the application forms a negative electrode layer above the flexible foil; (ii) applying a non-solid electrically insulating composition above the negative electrode layer to form an electrically insulating layer above the negative electrode layer; (iii) applying a non-solid positive electrode composition above the electrically insulating layer to form a positive electrode layer above the electrically insulating layer; and (iv) applying a non-solid positive electrode current collector composition above the positive electrode layer to form a positive electrode current collector layer above the positive electrode layer. In some embodiments, the formed multilayer energy storage device is in the form of a rolled tape. In some embodiments, the formed multilayer energy storage device is adhered onto a surface such that the flexible foil of the multilayer energy storage device is placed in direct contact with the surface.

In various embodiments, the formed multilayer energy storage devices are selected from the group consisting of capacitors, supercapacitors, batteries, hybrids thereof, and combinations thereof. In some embodiments, the one or more applying steps to form multilayer energy storage devices include at least one of spraying, brushing, rolling, printing, and combinations thereof. In some embodiments, each of the applying steps includes spraying.

In various embodiments, the methods of the present disclosure also include a step of associating formed multilayer energy storage devices with an energy conversion device. In some embodiments, the energy conversion devices are selected from the group consisting of solar cells, thermoelectrics, piezoelectrics, and combinations thereof. In some embodiments, the energy conversion devices are solar cells. In some embodiments, the energy conversion devices are adhered above a surface of the positive electrode current collector layer of a multilayer energy storage device. In some embodiments, a thermally insulating layer or a vibration resisting layer may be placed between the energy storage device and the energy conversion device.

DETAILED DESCRIPTION

Figure 1:
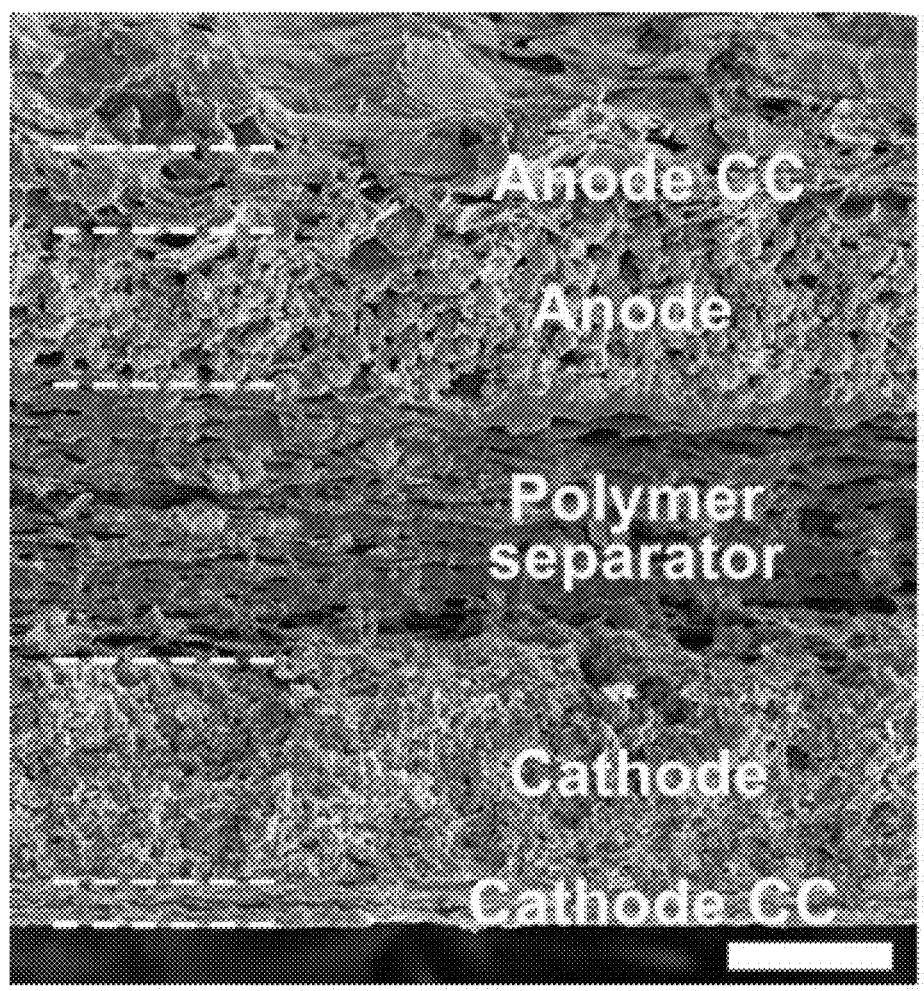
FIG. 1A is a scanning electron micrograph showing the cross section of a spray-fabricated energy storage device (i.e., a Lithium-ion cell).
FIG. 1B shows a scheme of the direct fabrication of an energy storage device (i.e., a battery) on a metal surface by sequential deposition of component paints using spray-deposition.
Figure 1:
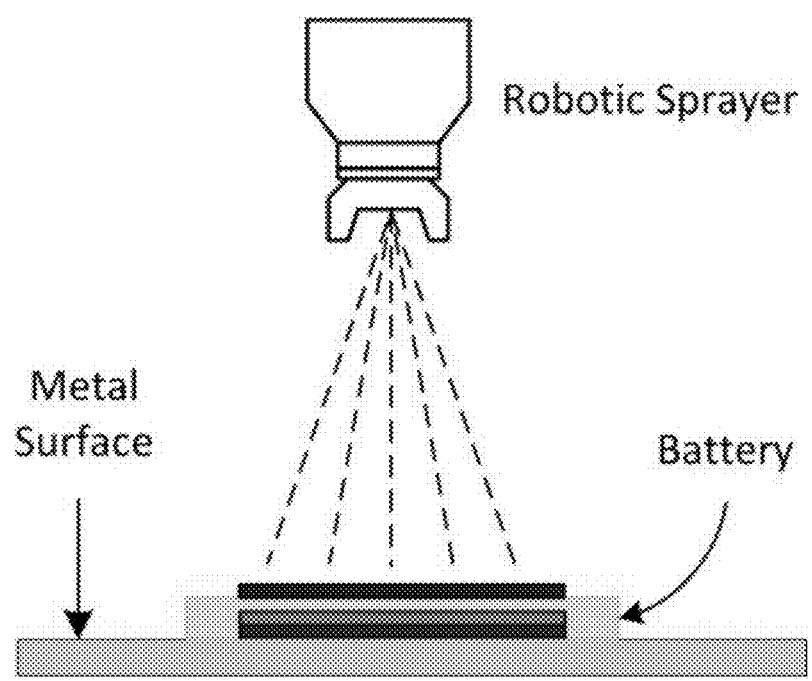

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Degradation of engineering materials and equipment due to corrosive environments is the cause of significant financial burden on various industries as well as the individual consumer. Apart from financial loss, degradation of materials due to corrosion is a major contributor to hazards to life and property. A few examples of when corrosion causes significant financial and safety concerns include automobiles, shipping, oil exploration, oil pipelines, and civic infrastructure (e.g., bridges and water pipelines).

In fact, a 2002 congressional study estimated losses of $276 billion by the American industry due to corrosion (Historic Congressional Study: Corrosion Costs and Preventative Strategies in the United States, a Supplement to Materials Performance, NACE International, Houston Tex. (July 2002)). Accordingly, a strategy to effectively prevent and manage corrosion of various materials (e.g., engineering materials and equipment) without significant maintenance or human intervention would be of enormous commercial interest.

Without being bound by theory, it is envisioned that corrosion of metals is the result of electrochemical oxidation due to corrosive environments. The tendency of metals to corrode is heavily dependent upon their electric potential with respect to the corrosive environment. A positively charged metallic surface (electron-poor) is more likely to undergo oxidation (corrosion). Conversely, a negatively charged metallic surface (electron-rich) is more likely to resist oxidation.

Cathodic protection, a key corrosion prevention technique widely employed in various industries, is based on the above concept. In this approach, the negative terminal of a battery is connected to the metallic surface to be protected, and the positive terminal is appropriately grounded. The battery maintains a constant negative potential on the metal with respect to its environment and protects the metal from corrosion. However, batteries used in cathodic protection applications need regular maintenance and replacement for effective corrosion protection.

Recently, Applicants developed a new method of fabricating energy storage devices, such as Lithium-ion batteries. See PCT/US2013/032394, entitled "Methods of Making Multilayer Energy Storage Devices", filed on Mar. 15, 2013. In this technique, each layer in the multilayer device is applied (e.g., spray-deposited) from specifically designed non-solids (e.g., "paints" or suspensions of various component materials). The layers are deposited in the correct sequence to obtain the desired multilayer energy storage device (e.g., Li-ion cell). The sequence can begin with either the positive electrode current collector or the negative electrode current collector to give identical results. For instance, the Scanning Electron Micrograph (SEM) image in FIG. 1A shows the cross-section of a spray-fabricated Li-ion cell composed of five layers—the positive electrode current collector (labeled as "cathode cc"), positive electrode (labeled as "cathode"), polymer separator, negative electrode (labeled as "anode") and negative electrode current collector (labeled as "anode cc"). Various embodiments of the present disclosure apply the above technology for cathodic protection of various surfaces.

Figure 2:
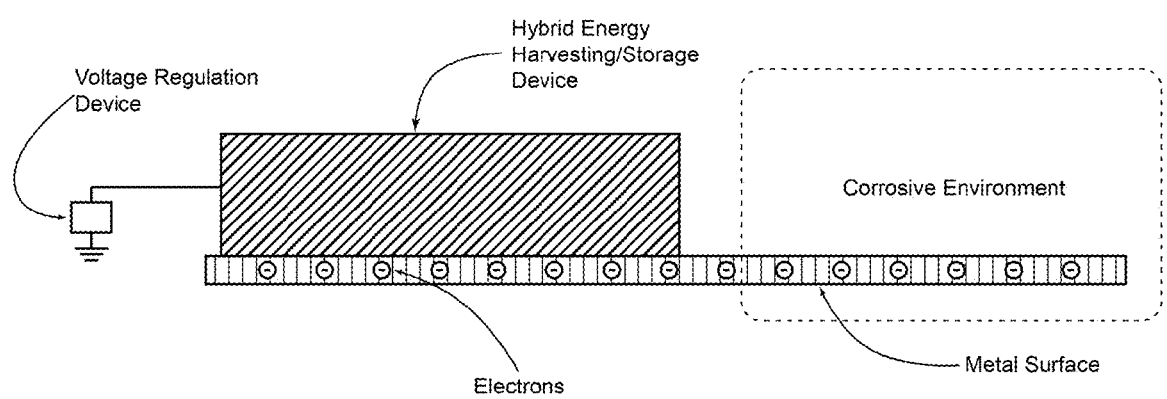
FIG. 2 shows a cathodic protection scheme using a hybrid device composed of an energy storage device and energy conversion device (also referred to as an energy harvesting device herein). In particular, a method of protecting a metal surface from corrosion is shown by using the hybrid device. The energy storage device (i.e., a battery) is integrated with the metallic surface that is to be protected. The negative electrode (−ve electrode) of the energy storage device maintains the metallic surface at a negative potential. The energy conversion device is integrated with the energy storage device and charges the battery when exposed to light.

An embodiment of the inventive disclosure is directed to a method of protecting a metal surface from corrosion by conformably attaching a hybrid device comprising at least one energy storage device and at least one energy conversion device (also referred to herein as an energy harvesting device). For instance, FIG. 2 shows a hybrid device comprising at least one energy storage device and at least one energy conversion device that can provide cathodic protection of metal against corrosion. In certain embodiments, the energy storage device, which in certain instances can be a multilayer energy storage device, is attached to a surface to prevent corrosion. In certain embodiments, the energy storage device is a multilayer energy storage device selected from capacitors, supercapacitors, batteries, hybrids and combinations thereof. In other embodiments, the energy conversion device is selected from solar cells, thermoelectrics, piezoelectrics, and combinations thereof.

Figure 3:
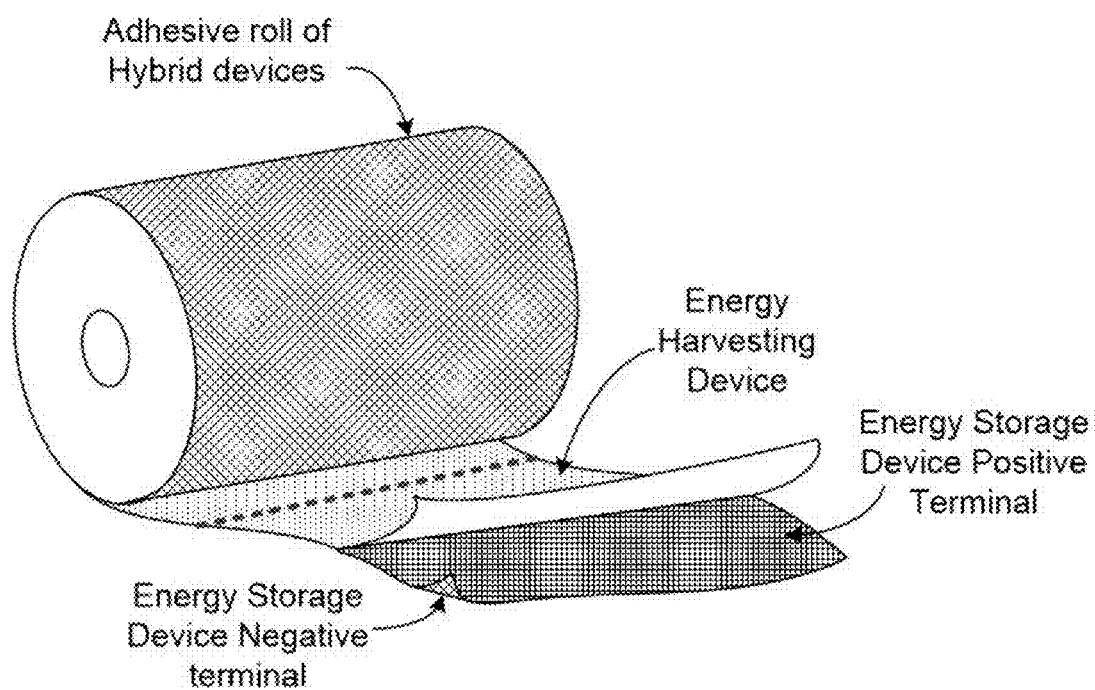
FIG. 3 shows the components of a hybrid energy conversion-storage device that is flexible. Such flexible hybrid devices can be made in the form of a hybrid "tape roll" produced in a roll-to-roll fashion. A desired area of the tape can be cut and pasted onto a metal surface to provide cathodic protection.

In certain embodiments, the hybrid device, which can be either mechanically flexible or rigid, is comprised of at least one energy conversion device and at least one energy storage device. For instance, FIG. 3 shows a flexible hybrid device that includes a flexible energy storage device and a flexible energy conversion device.

Figure 4:
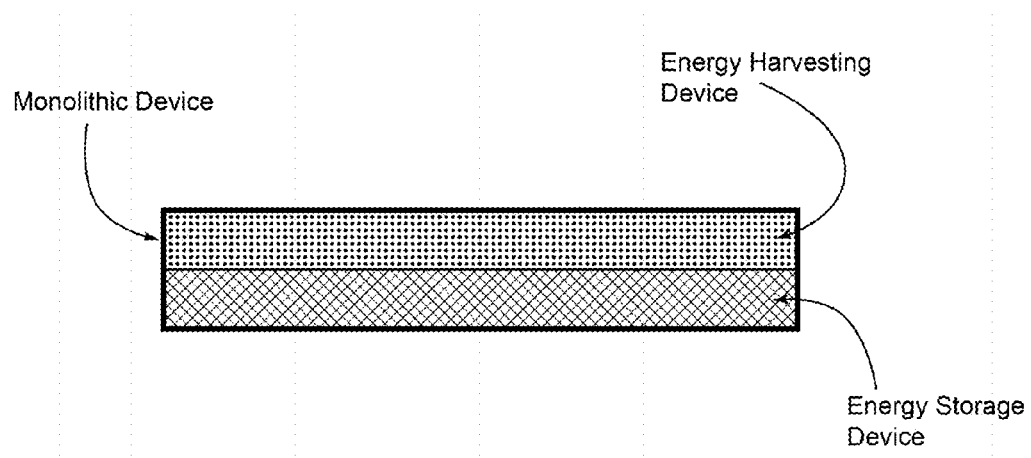
FIG. 4 shows a method of attaching an energy conversion device with an energy storage device in a monolithic unit.
Figure 5:
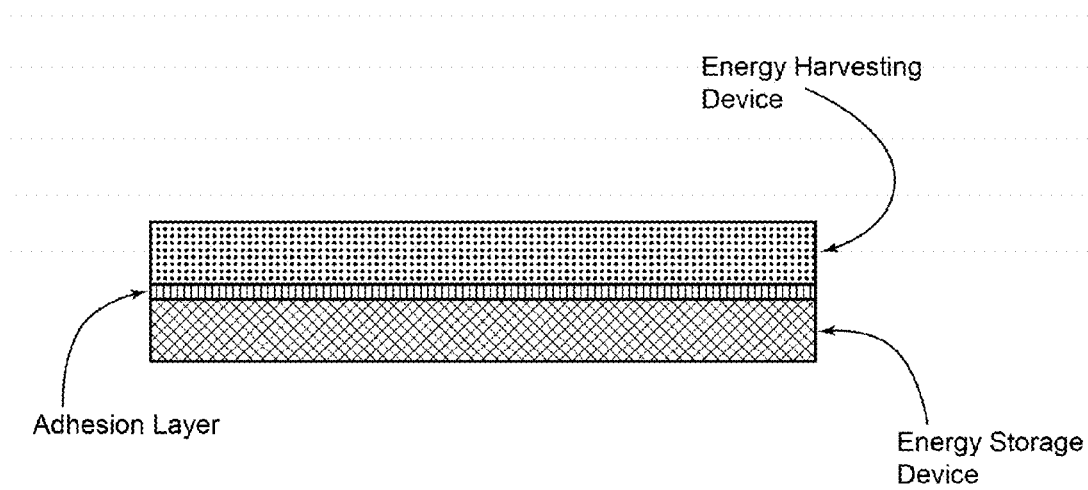
FIG. 5 shows a method of physically attaching an energy conversion device with an energy storage device.

In certain embodiments, the energy conversion device and the energy storage device are combined in a monolithic unit. An example of such an embodiment is shown in FIG. 4. In some embodiments, the combining of the energy conversion device and the energy storage device into a single monolithic unit can be carried out by using adhesion, epoxies, mechanical means, making energy storage devices directly on top of energy conversion devices, or combinations thereof. For instance, as illustrated in FIG. 5, an energy storage device can be physically attached to an energy conversion device with an adhesion layer that includes an adhesive layer.

Figure 6:
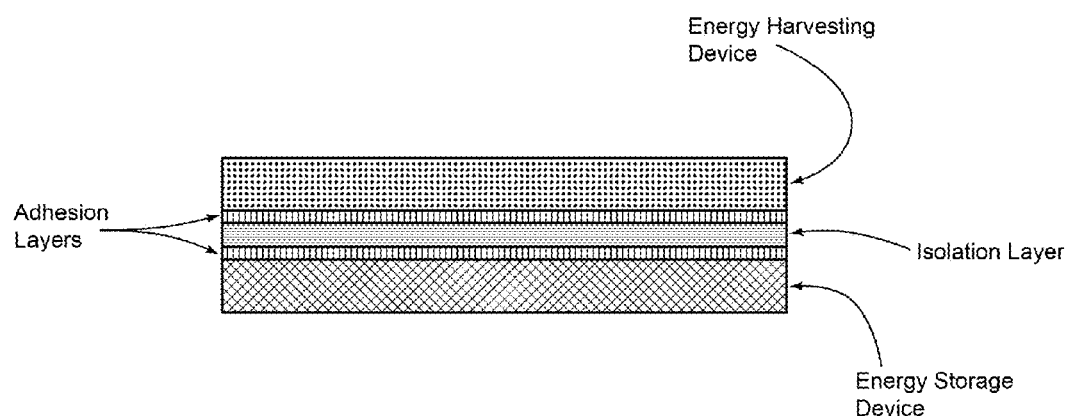
FIG. 6 shows a method of attaching an isolation layer between the energy conversion device and an energy storage device.

In certain embodiments, an isolating layer such as an electrically insulating layer, thermally insulating layer, vibration resistant layer or combinations thereof, is placed between the energy conversion device and energy storage device. Similar to the attachment of the energy conversion device to the energy storage device, the isolating layer is attached to the energy conversion device and the energy storage device by physical attachment using adhesion, epoxies, mechanical means or combinations thereof. For instance, as illustrated in FIG. 6, an isolating layer can be physically attached in between the energy conversion device and an energy storage device through adhesion layers.

In certain embodiments, the isolating layer is a non-solid. In some embodiments, the isolating layer is selected from polymers, adhesives, adhesion promoters, inorganic additives, solvents, electrolyte salts, ionic liquids, electrolyte solvents, aqueous electrolytes, or combinations thereof.

Figure 7:
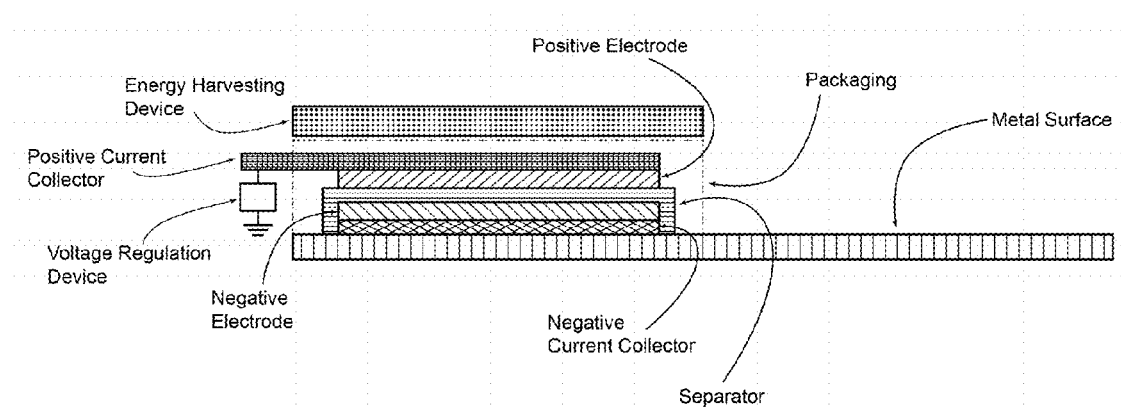
FIG. 7 shows a method of connecting a negative electrode of an energy storage device with the metal that needs protection from corrosion.

In some embodiments, the energy storage device is in electrical contact with a surface requiring protection from corrosion. In certain embodiments, the negative electrode of the energy storage device is in electrical contact with the surface which needs protection from corrosion and the positive electrode of the multilayer energy storage device is in electrical contact with the environment. In certain embodiments, the electrical contact is established using electrically conducting wires. For instance, FIG. 7 shows a method of electrically connecting the negative electrode of an energy storage device with the metal that needs protection against corrosion while the positive electrode of the energy storage device is grounded. In certain embodiments, a negative electrode of the energy conversion device is electrically connected to a negative electrode of the energy storage device and a positive electrode of the energy conversion device is electrically connected to a positive electrode of the energy storage device. An example of this embodiment is shown in FIG. 8.

Figure 8:
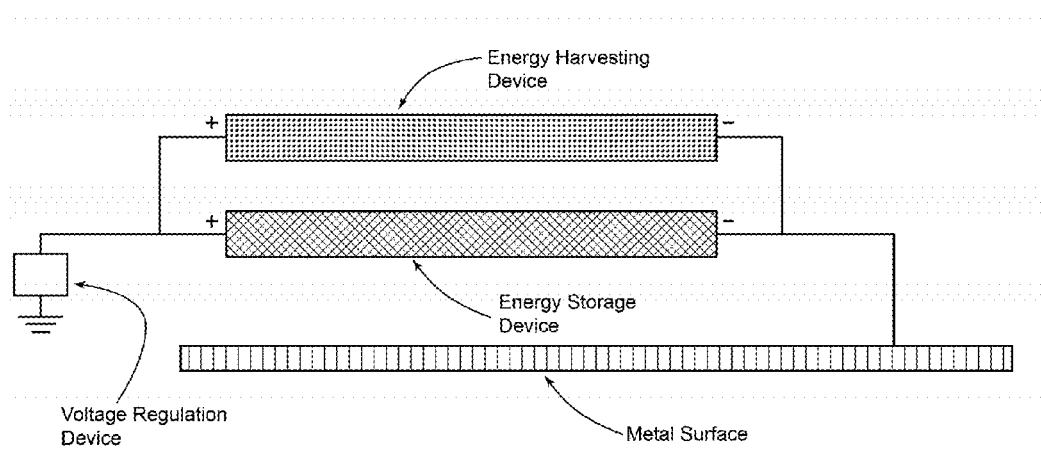
FIG. 8 shows a method of electrically connecting an energy conversion device, an energy storage device, and a surface which needs protection from corrosion.

In certain embodiments of the claimed invention, a multilayer energy storage device is formed on a substrate that is in need of protection from corrosion (e.g., as shown in FIG. 8). In some embodiments, the substrate can be mechanically rigid or flexible. Additionally, the substrate can be an electrically conducting substrate or one that is non-conducting. Furthermore, the substrate can be any metal substrate, an energy conversion device or an energy storage device.

In certain embodiments of the claimed invention, a multilayer energy storage device is formed on a metallic substrate that is in need of protection from corrosion. In some embodiments, the metallic substrate can be mechanically rigid or flexible.

In some embodiments, the substrate is a non-conducting substrate. In certain embodiments, the non-conducting substrate is the surface of an energy conversion device. In certain other embodiments, the non-conducting substrate can be another energy storage device.

Figure 9:
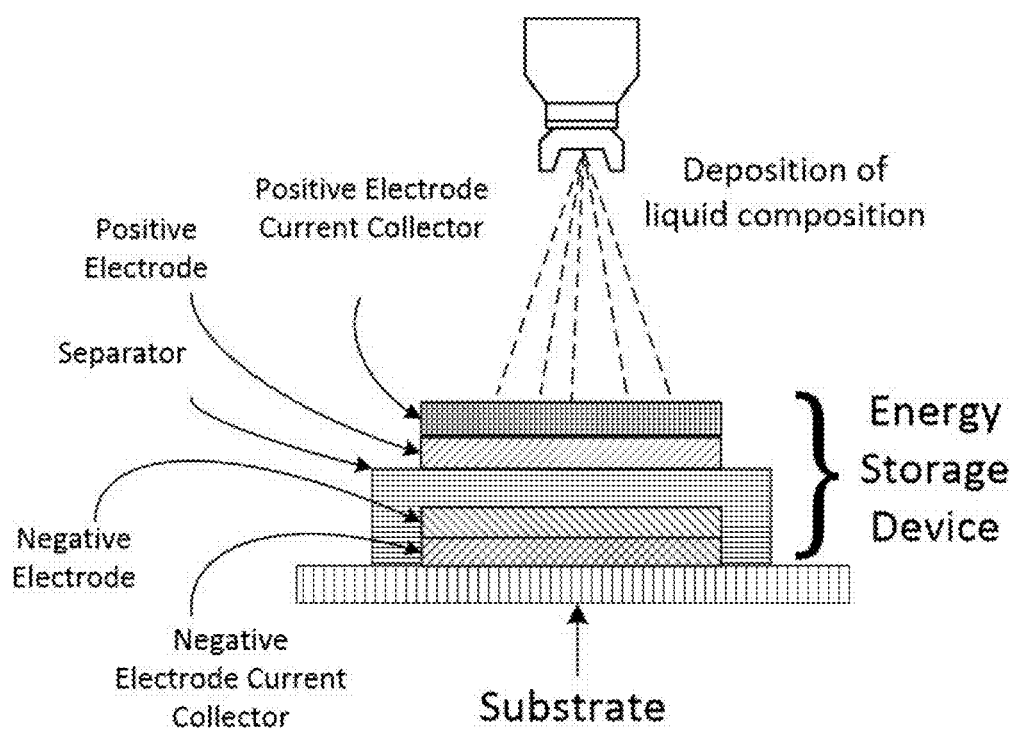
FIG. 9 shows a method of making a multi-layered energy storage device on a substrate. The fabrication of an energy storage device on a substrate by sequential deposition of non-solid components using spray deposition is shown, where the negative electrode current collector is in direct contact with the substrate.

In some embodiments, the present disclosure pertains to methods of protecting a surface (e.g., a metal surface) from corrosion by forming a multilayer energy storage device on the surface. In some embodiments, the multilayer energy storage device is formed on the surface by the following steps: (1) applying a non-solid negative electrode current collector composition above the surface to form a negative electrode current collector layer above the surface; (2) applying a non-solid negative electrode composition above the negative electrode current collector layer to form a negative electrode layer above the negative electrode current collector layer; (3) applying a non-solid electrically insulating composition above the negative electrode layer to form an electrically insulating layer above the negative electrode layer; (4) applying a non-solid positive electrode composition above the electrically insulating layer to form a positive electrode layer above the electrically insulating layer; and (5) applying a non-solid positive electrode current collector composition above the positive electrode layer to form a positive electrode current collector layer above the positive electrode layer. For instance, FIG. 9 shows the formation of a multilayer energy storage device on a substrate by spray depositing the non-solid components starting from the non-solid composition of negative current collector.

Figure 10:
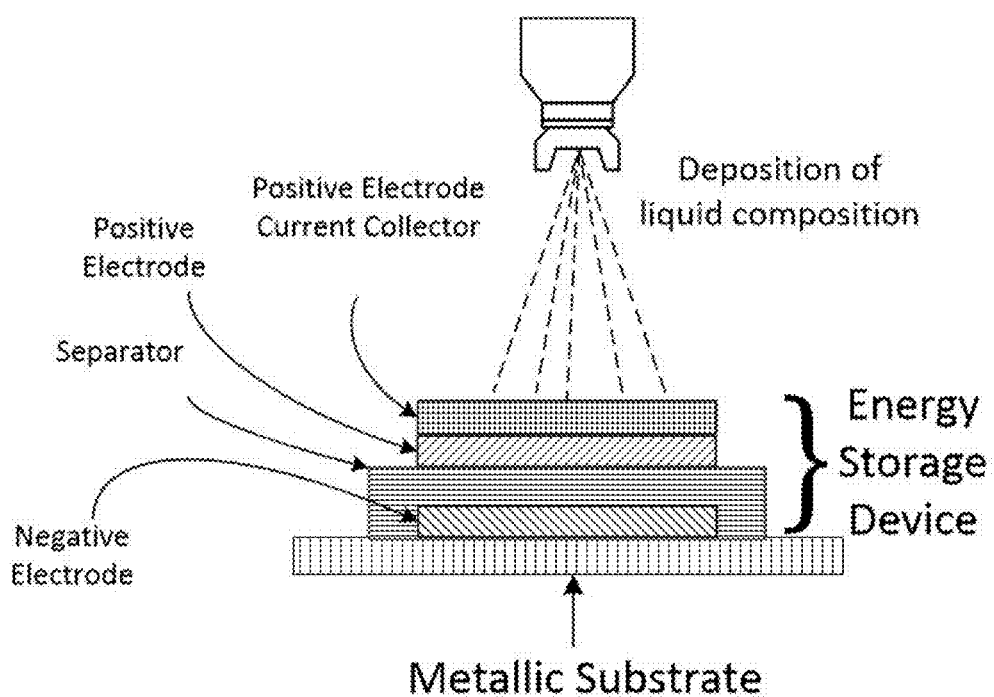
FIG. 10 shows a method of making a multi-layered energy storage device on a metallic substrate. The fabrication of an energy storage device on a metallic substrate by sequential deposition of non-solid components using spray deposition is shown, where the negative electrode is in direct contact with the metallic (i.e., electrically conducting) substrate.

In some embodiments, the first step of applying the non-solid negative electrode current collector composition may be optional since the surface (e.g., a metallic surface) may be electrically conducting. For instance, FIG. 10 shows the formation of a multi-layer energy storage device on a surface (e.g., a metallic substrate that needs protection from corrosion), by first spray depositing the non-solid negative electrode formulation on top of the surface (i.e., the metal substrate).

In additional embodiments, the present dislcosure pertains to methods of protecting a surface from corrosion by (a) forming a multilayer energy storage device; and (b) adhering the multilayer energy storage device onto the surface. In some embodiments, the multilayer energy storage device is formed by the following steps: (i) applying a non-solid negative electrode composition above a flexible foil that can function as a negative electrode current collector layer (e.g., a copper foil), where the application forms a negative electrode layer above the flexible foil; (ii) applying a non-solid electrically insulating composition above the negative electrode layer to form an electrically insulating layer above the negative electrode layer; (iii) applying a non-solid positive electrode composition above the electrically insulating layer to form a positive electrode layer above the electrically insulating layer; and (iv) applying a non-solid positive electrode current collector composition above the positive electrode layer to form a positive electrode current collector layer above the positive electrode layer.

In some embodiments, the formed multilayer energy storage device is in the form of a rolled tape. An example of such an embodiment is shown in FIG. 3. In some embodiments, the formed multilayer energy surface device is adhered onto the surface by the use of an adhesive. In some embodiments, the formed multilayer energy storage device is adhered onto a surface such that the flexible foil of the multilayer energy storage device is placed in direct contact with the surface.

In additional embodiments, the present dislcosure pertains to methods of protecting a surface from corrosion by (a) forming a multilayer energy storage device; and (b) adhering the multilayer energy storage device onto the surface. In some embodiments the multi-layer energy storage device is formed on the surface (e.g., a solar cell, a non-conducting surface, and the like) by the following steps: (1) applying a non-solid positive electrode current collector composition above the surface to form a positive electrode current collector layer above the surface; (2) applying a non-solid positive electrode composition above the positive electrode current collector layer to form a positive electrode layer above the positive electrode current collector layer; (3) applying a non-solid electrically insulating composition above the positive electrode layer to form an electrically insulating layer above the positive electrode layer; (4) applying a non-solid negative electrode composition above the electrically insulating layer to form a negative electrode layer above the electrically insulating layer; and (5) applying a non-solid negative electrode current collector composition above the negative electrode layer to form a negative current collector layer above the negative electrode layer. In some embodiments, the first step of applying the non-solid positive electrode current collector composition may be optional (e.g., instances where a metallic substrate is electrically conducting).

Figure 11:
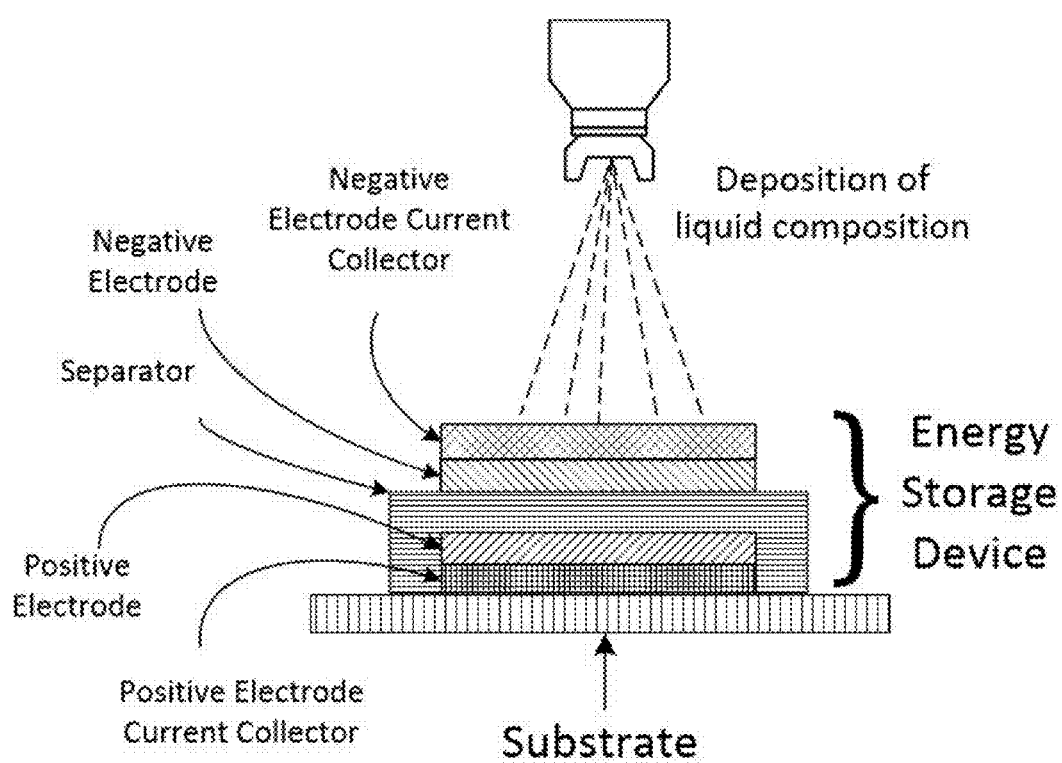
FIG. 11 shows a method of making an energy storage device on a substrate, where the positive electrode current collector is in direct contact with the substrate. The fabrication of an energy storage device on a substrate by sequential deposition of non-solid components using spray deposition is shown, where the positive electrode current collector is in direct contact with the substrate.
Figure 12:
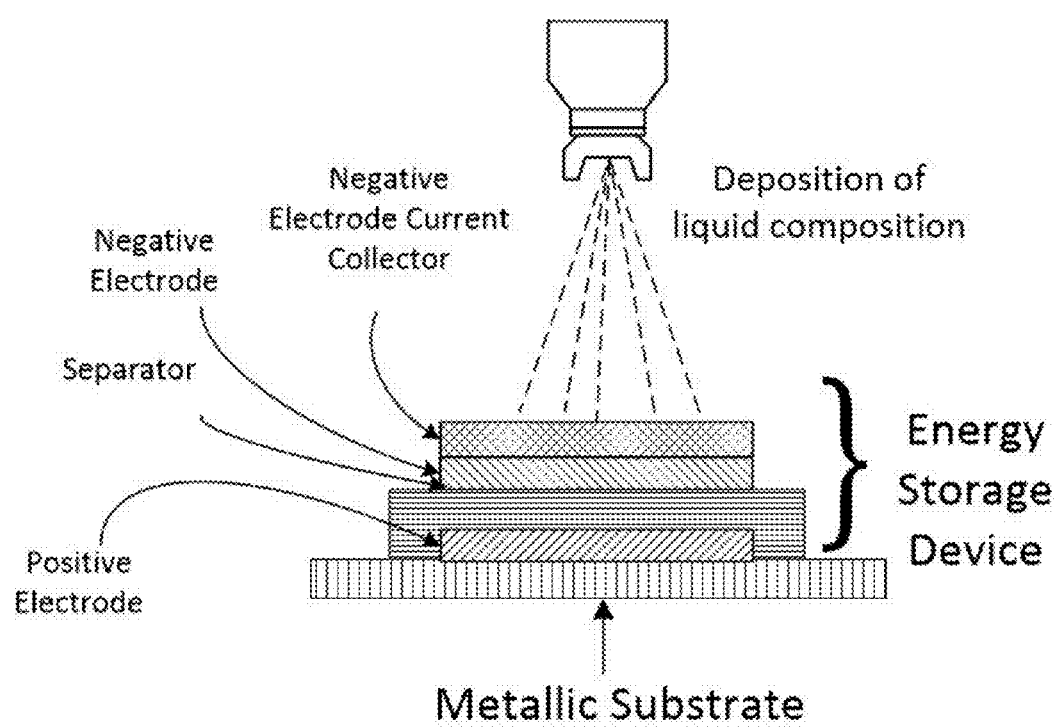
FIG. 12 shows a method of making an energy storage device on a substrate, where the positive electrode layer is in direct contact with the substrate.

Examples of the aforementioned embodiments are illustrated in FIGS. 11-12. For instance, FIG. 11 shows the formation of a multilayer energy storage device on a substrate by spray depositing the non-solid components starting from the non-solid composition of a positive current collector.

Likewise, FIG. 12 illustrates an embodiment where the first step of applying the non-solid positive electrode current collector composition is optional since the metallic substrate is electrically conducting. In particular, FIG. 12 shows the formation of a multi-layer energy storage device on a metal surface (e.g., a metallic substrate that needs protection from corrosion) by first spray depositing a non-solid negative electrode formulation on top of the metal.

In various embodiments, the methods of the present disclosure also include a step of associating formed multilayer energy storage devices with an energy conversion device, such as solar cells. As set forth in more detail herein, the methods of the present disclosure have various embodiments. For instance, various types of compositions may be utilized to make various types of multilayer energy storage devices by various methods.

Compositions

The methods of the present disclosure can utilize various types of current collector compositions, electrode compositions (i.e., negative electrode or positive electrode compositions), and electrically insulating compositions to form the individual layers of the multilayer energy storage devices. In some embodiments, the compositions of the present disclosure may be in solid form. In some embodiments, the compositions of the present disclosure may be in non-solid form before an application step, such as in liquid form. Thereafter, the compositions may form one or more solid layers that become part of a multilayer energy storage device.

In some embodiments, the non-solid compositions may be in liquid form. In some embodiments, the non-solid compositions may be in the form of sols, gels, liquid emulsions, liquid dispersions, and combinations thereof. In some embodiments, the non-solid compositions may be in the form of an emulsion. In some embodiments, the non-solid compositions may be in the form of a sol (i.e., non-solid dispersion). In some embodiments, the non-solid compositions may be in the form of gels. In some embodiments, the non-solid compositions may be in the form of paints.

Current Collector Compositions

Current collector compositions generally refer to compositions that form an electrically conducting current collector layer. In various embodiments, the current collector layers can be in contact with the respective electrode layers and capable of collecting current from the electrode layer, or supplying current to the electrode layer. In some embodiments, the current collector compositions of the present disclosure may be in solid form, such as in the form of a flexible foil that serves as a negative electrode current collector. In some embodiments, the current collector compositions of the present disclosure may be in non-solid form, as previously described (e.g., non-solid dispersions and non-solid emulsions).

In some embodiments, the current collector compositions of the present disclosure may be positive electrode current collector compositions that can collect current from or supply current to the positive electrode (also known as the cathode). In some embodiments, the positive electrode current collector compositions may include, without limitation, aluminum, iron, gold, silver, carbon nanotubes, graphene, conducting polymers, and combinations thereof. In more specific embodiments, the positive electrode current collector compositions may include carbon nanotubes, such as single-walled carbon nanotubes (SWNTs), double-walled carbon nanotubes, multi-walled carbon nanotubes, ultra-short carbon nanotubes, functionalized carbon nanotubes, non-functionalized carbon nanotubes, pristine carbon nanotubes, doped carbon nanotubes and combinations thereof.

In some embodiments, the current collector compositions of the present disclosure may be negative electrode current collector compositions that can collect current from or supply current to the negative electrode (also known as the negative electrode electrode). In some embodiments, the negative electrode current collector composition may include, without limitation, copper, nickel, titanium, and combinations thereof.

In various embodiments, the current collector compositions of the present disclosure may also include additional materials. Such materials may include, without limitation, solvents, conductive nanomaterials, surfactants, and combinations thereof.

For instance, in some embodiments, the current collector compositions of the present disclosure may include, without limitation, one or more solvents, such as N-methylpyrrolidone (NMP), N,N-Dimethylformamaide (DMF), acetone, propanol, ethanol, methanol, water, and combinations thereof. Likewise, in some embodiments, the current collector compositions of the present disclosure may include one or more conductive nanomaterials, such as conductive nanoparticles, conductive micro particles, conductive nanowires, carbon nanotubes, carbon blacks, graphite (e.g., ultrafine graphite or UFG), carbon fibers, and combinations thereof. In some embodiments, the current collector compositions of the present disclosure may include one or more surfactants, such as sodium dodecyl sulfate (SDS), dodecylbenzenesulphonate (SDBS), dodecyltrimethylammonium bromide (DTAB), triton-x, and combinations thereof.

In more specific embodiments, the current collector compositions of the present disclosure may include a positive electrode current collector composition containing purified HiPCO SWNTs, carbon black (e.g., Super P™), and NMP. In further embodiments, the current collector compositions of the present disclosure may include a negative electrode current collector composition containing copper conductive paint.

The current collector compositions of the present disclosure can be prepared by various methods. For instance, in some embodiments, current collector paints may be prepared by dispersing conductive powders (e.g., Cu or Ti powders for the negative electrode current collector compositions and Cr or Al for the positive electrode current collector compositions) and nanomaterials (e.g. metallic nanoparticles or micro particles, metallic nanowires, single-walled or multi-walled carbon nanotubes) in water or organic solvents (e.g., DMF, ethanol, NMP, etc.) in the presence of surfactants (e.g., SDS, SDBS, triton, etc). Additional methods by which to make current collector compositions can also be envisioned.

In some embodiments, current collector compositions can be extended with conductive terminals. In some embodiments, the extensions can be done by attaching Al or Ni tabs, or by gluing.

Electrode Compositions

Electrode compositions generally refer to compositions that, when applied in the form of a layer, can serve as negative or positive electrodes (also known as anodes or cathodes, respectively) of an energy storage device. In some embodiments, the electrode compositions of the present disclosure may include a positive electrode composition. In some embodiments, the positive electrode composition may include, without limitation, lithium cobalt oxide ($LiCoO_2$), lithium manganese oxide ($LiMn_2O_4$), lithium iron phosphate ($LiFePO_4$), vanadium oxide ($VO_2$), lithium nickel manganese cobalt oxide (NMC), lithium nickel cobalt aluminum oxide (NCA), carbon based materials, $MnO_2$, $RuO_2$, and combinations of thereof.

In some embodiments, the electrode compositions of the present disclosure may include a negative electrode composition. In some embodiments, the negative electrode composition may include, without limitation, at least one of graphite (e.g. natural or synthetic graphite), carbon materials, lithium titanium oxide ($Li_4Ti_5O_{12}$), silicon (Si), graphene, molybdenum sulfides, titanium oxide, tin (Sn), tin oxide, carbon based materials, $MnO_2$, $RuO_2$, and combinations thereof.

In various embodiments, the electrode compositions of the present disclosure may also include additional materials, including, but not limited to polymers, solvents, conductive nanomaterials, and combinations thereof. For instance, in some embodiments, the electrode compositions of the present disclosure may include one or more polymers, such as poly(vinylidene fluoride) (PVDF), poly(methy methacrylate) (PMMA), sodium carboxymethyl cellulose (CMC—Na), poly(tetrafluoroethylene) (PTFE), poly(vinyl acetate) (PVA), poly(vinylpyrrolidones) (PVP), polyacrylonitrile (PAN), polyethylene oxide (PEO), gelatin, Kynarflex™, polyimides, polyanilines, and combinations thereof.

Likewise, in some embodiments, the electrode compositions of the present disclosure may include, without limitation, one or more solvents, such as N-methylpyrrolidone (NMP), N,N-Dimethylformamaide (DMF), acetone, propanol, ethanol, methanol, water, and combinations thereof. In some embodiments, the electrode compositions of the present disclosure may include one or more conductive nanomaterials, such as conductive nanoparticles, conductive micro particles, conductive nanowires, carbon nanotubes, carbon blacks, graphite, carbon fibers, and combinations thereof.

In more specific embodiments, the electrode compositions of the present disclosure may include positive electrode compositions containing $LiCoO_2$, carbon black (e.g., Super P™), UFG, and PVDF in NMP. In further embodiments, the electrode compositions of the present disclosure may include negative electrode compositions containing $Li_4Ti_5O_{12}$, UFG, and PVDF in NMP. Furthermore, various methods may be utilized to make the electrode compositions of the present disclosure.

Electrically Insulating Compositions

Electrically insulating compositions generally refer to compositions that, when applied in the form of a layer, function as an electrically insulating barrier between the positive and negative electrodes of an energy storage device. In various embodiments, electrically insulating compositions can also function as an ion conducting medium between the positive and negative electrodes of an energy storage device. In the present disclosure, electrically insulating compositions may also be referred to as separators, polymer separators or electrolytes.

The electrically insulating compositions of the present disclosure may have various contents. In some embodiments, the electrically insulating compositions may include, without limitation, polymers, adhesion promoters, inorganic additives, solvents, electrolyte salts, electrolytes, aqueous electrolytes, solvents, and combinations thereof.

For instance, in some embodiments, the electrically insulating compositions of the present disclosure may include, without limitation, one or more polymers, such as poly(vinylidene fluoride) (PVDF), poly(methyl methacrylate) (PMMA), sodium carboxymethyl cellulose (CMC—Na), poly(tetrafluoroethylene) (PTFE), poly(vinyl acetate) (PVA), poly(vinylpyrrolidones) (PVP), poly(ethylene) (PE), polypropylene (PP), polyethylene oxide (PEO), gelatin, Kynar™, polyimides, polyesters and combinations thereof. Likewise, in some embodiments, the electrically insulating compositions of the present disclosure may include one or more adhesion promoters, such as acrylate polymers, epoxies, and combinations thereof.

In some embodiments, the electrically insulating compositions of the present disclosure may include one or more inorganic additives, such as inorganic oxides and inorganic nitrides. Suitable inorganic oxides may include, without limitation, magnesium oxides, titanium oxides, silicon oxides, aluminum oxides, and combinations thereof. Suitable inorganic nitrides may include, without limitation, boron nitrides, silicon nitrides, aluminum nitrides, magnesium nitrides, titanium nitrides, and combinations thereof.

In some embodiments, the electrically insulating compositions of the present disclosure may include one or more solvents. Suitable solvents, may include, without limitation, N-methylpyrrolidone (NMP), N,N-Dimethylformamaide (DMF), acetone, methyl ethyl ketone, hexane, chloroform, toluene, xylene, propanol, ethanol, methanol, water, and combinations thereof.

Likewise, in some embodiments, the electrically insulating compositions of the present disclosure may include one or more electrolytes. Suitable electrolytes may include, without limitation, $LiPF_6$, $LiBF_4$, $LiClO_4$, $Li_7La_3Zr_2O_{12}$, $LiNO_3$, lithium ion conducting room temperature ionic liquids, lithium ion conducting graphite oxide, and combinations thereof.

In more specific embodiments, the electrically insulating compositions of the present disclosure may include Kynarflex™, PMMA, $SiO_2$, acetone, and DMF. Additional electrically insulating compositions can also be envisioned.

Various methods may also be used to make the electrically insulating compositions of the present disclosure. In some embodiments, electrically insulating compositions can be made by dissolving a polymer or mixtures of polymers with one or more adhesion promoters and performance enhancing inorganic additives (e.g., 0-30 wt % or more) in one or more solvents. The one or more polymers used may include, without limitation, CMC—Na, Kynar-2801, PVDF, PTFE, PVA, PVP, Polyethylene, polypropylene, PEO, and combinations thereof. The adhesion promoters may include, without limitation, PMMA or other acrylate polymers. The performance enhancing inorganic additives and fillers used may include fumed $SiO_2$, $Al_2O_3$ or other inorganic oxides.

The solvents used may include, without limitation, DMF, acetone, water, ethanol, methanol or combinations thereof.

In more specific embodiments, the electrically insulating compositions of the present disclosure may form by preparing a 9% w/v kynar-2801® (sol. A) and a PMMA (Sol. B) solution separately in acetone, preparing a 8% w/v dispersion of fumed $SiO_2$ in DMF, and mixing 6 parts of sol. A, 2 parts of sol. B and 1 part of sol. C to form the electrically insulating composition. Additional methods by which to make electrically insulating compositions can also be envisioned.

Layer Formation

Various methods may be used to form individual layers from the compositions of the present disclosure. In some embodiments, layers may form by applying respective compositions above a surface or another layer. Various methods may be used for such application steps. Exemplary application methods may include, without limitation, spraying, painting, brushing, rolling, printing, thermal spraying, cold spraying and combinations of such methods. In some embodiments, the applying may occur by spraying respective compositions above a surface or another layer. In some embodiments, the spraying may include, without limitation, ultrasonic spraying, thermal spraying, electrostatic spraying, and combinations thereof.

In more specific embodiments, the applying may occur by spray painting techniques, such as spray painting compositions from aerosol cans, spray guns, or air brushes. In some embodiments, the applying of a layer may be followed by hot or cold roll pressing of the layer one or more times to achieve a higher degree of compaction. In some embodiments where a composition is in solid form, the applying step may include placing the solid composition above another layer by various mechanical methods.

Furthermore, each layer of a formed multilayer energy storage device may be composed of a single layer or multiple sub-layers. For instance, in some embodiments, a composition can be applied above a surface or another layer multiple times to form a plurality of layers above the surface or the other layer. In other embodiments, a composition can be applied above a surface or another layer once to form a single layer above the surface or the other layer. In some embodiments, the compositions that are applied multiple times may be the same compositions. In some embodiments, the compositions that are applied multiple times may include one or more different compositions.

In more specific embodiments, a non-solid electrically insulating composition can be applied above a first electrode layer multiple times to form a plurality of electrically insulating layers above the first electrode layer. In further embodiments, one or more different non-solid electrically insulating compositions may be applied above the first electrode layer multiple times to form a plurality of one or more different non-solid electrically insulating layers above the first electrode layer. In some embodiments, a plurality of distinct non-solid electrically insulating compositions may be applied sequentially above the electrode layer to form a plurality of electrically insulating layers, each with a distinct composition. In other embodiments, the non-solid electrically insulating composition can be applied once to form a single electrically insulating layer above the first electrode layer.

Furthermore, the formed layers of the present disclosure can have various thicknesses. For instance, in some embodiments, a formed layer may have a thickness that ranges from about 0.1 µm to about 1 mm. In some embodiments, a formed layer may have a thickness that ranges from about 1 µm to about 500 µm. In some embodiments, a formed layer may have a thickness of about 200 µm.

The formed layers may also have various shapes and sizes. In some embodiments, the layers may be in the form of circles, ovals, triangles, squares, rectangles, and other shapes. In some embodiments, the formed layers may have a pre-defined shape that is conferred by a mold or a cast. For instance, layers with desired shapes may be achieved by using a stencil or shadow mask. In some embodiments, layers with desired shapes may be achieved by the use of precisely defined movements of a robotic device, such as a robotic manipulator or arm.

Furthermore, the layers of the present disclosure may be derived from various types of compositions. In particular, various current collector compositions, electrode compositions, and electrically insulating compositions may be utilized to form the individual layers.

Surfaces

The methods of the present disclosure may be applied above various surfaces in order to form multilayer energy storage devices on those surfaces. For instance, in some embodiments, the surfaces may include, without limitation, glasses, fabrics, metals, plastics, ceramics, and combinations thereof.

In more specific embodiments, the surfaces may be metallic surfaces. In some embodiments, the surfaces may be associated with various structures that are vulnerable to corrosion. In some embodiments, such objects include, without limitation, ships, oil rigs, chemical plants, bridges, construction and mining equipment, and the like.

In some embodiments, the surface may be chemically cleaned before an application step. In some embodiments, such cleaning can help remove dirt, oil or other contaminants from the surface. In some embodiments, a surface can be pre-treated to increase adhesion of applied compositions (e.g., adhesion of painted layers with a substrate).

In some embodiments, the surface may be heated before or during an application step. For instance, in some embodiments, the surface may be heated from about 50° C. to about 200° C. before an application step. In some embodiments, the surface may be at room temperature during an application step.

In some embodiments, it may also be desirable for the surfaces to not have any potential for chemical reactions with the multilayer energy storage device components. In some embodiments, it may also be desirable for the surfaces to have good adhesive properties for the compositions that are applied to the surfaces.

Furthermore, the surfaces of the present disclosure may have various shapes and sizes. In some embodiments, the surfaces may be in the form of circles, ovals, triangles, squares, rectangles, and other shapes. In some embodiments, the surfaces may be flat. In some embodiments, the surfaces may be curved. In some embodiments, the surfaces may have a pre-defined shape that is conferred by a mold or a cast.

Formed Multilayer Energy Storage Devices

The methods of the present disclosure may be utilized to form various types of multilayer energy storage devices. In some embodiments, the formed multilayer energy storage devices may include, without limitation, capacitors, supercapacitors, batteries, hybrids thereof, and combinations thereof. In some embodiments, the formed multilayer energy storage devices may include batteries, such as lithium ion batteries. The formation of additional multilayer energy storage devices by the methods of the present disclosure can also be envisioned.

Post-Processing Steps

Additional embodiments of the present disclosure may also include a step of activating the formed multi-layer energy storage devices. For instance, in some embodiments, the activating may include an addition of an electrolyte to the formed multi-layer energy storage device. In some embodiments, the electrolytes are selected from ionic liquids, non-aqueous electrolyte, aqueous electrolyte, solid polymer electrolyte, solid electrolyte and combinations thereof. In further embodiments, the added electrolyte may include, without limitation, $LiPF_6$, $LiBF_4$, $LiClO_4$, $LiNO_3$, ethylene carbonate, di-methyl carbonate, propylene carbonate, water, lithium ion conducting room temperature ionic liquids, and combinations thereof. In some embodiments, the activated multilayer energy storage device may be sealed in a pouch (e.g., laminated aluminum foil or equivalent container) after electrolyte exposure. In some embodiments, the sealing may occur inside a glove box or other controlled environment.

Further embodiments of the present disclosure may also include a step of drying the formed multilayer energy storage devices. For instance, in some embodiments, the drying may occur in a vacuum. In some embodiments, the drying may occur in an oven or a heated environment. In some embodiments, the drying may occur by blow drying, such as blow drying with compressed air or with hot air.

Association with Energy Conversion Devices

In various embodiments, the methods of the present disclosure also include a step of associating formed multi-layer energy storage devices with an energy conversion device (also referred to as an energy harvesting device). In some embodiments, the energy conversion devices are selected from the group consisting of solar cells, thermoelectrics, piezoelectrics, and combinations thereof. In some embodiments, the energy conversion devices are solar cells. In some embodiments, the energy conversion devices are adhered above a surface of the positive electrode current collector layer of a multilayer energy storage device.

In some embodiments, an energy conversion device is adhered above a surface of the positive electrode current collector layer of the formed multilayer energy storage device before the formed multilayer energy storage device is adhered onto the surface (i.e., as in the case of the additional embodiments set forth above). In some embodiments, an energy conversion device is adhered above a surface of the positive electrode current collector layer of the formed multilayer energy storage device after the formed multilayer energy storage device is adhered onto the surface. In some embodiments, the negative terminal of the formed multi-layer energy surface device is connected to the surface to be protected, and the positive terminal is placed in contact with the environment, such as by grounding.

In some embodiments, the energy conversion device is associated with the formed multilayer energy storage device in non-solid form. In some embodiments, the energy conversion device is associated with the formed multilayer energy storage device by at least one of spraying, brushing, rolling, printing, and combinations thereof. In some embodiments, a thermal insulator or a vibration resistant layer is placed between the formed multilayer energy storage device and the energy conversion device.

In some embodiments, the energy conversion device is associated with a top of an energy storage device. In some embodiments, the energy conversion device can be kept separate from the energy conversion device (e.g., on surfaces which are underground or under sea).

Additional Variations

The methods of the present disclosure can have numerous variations. For instance, in some embodiments, a charged energy storage device (such as a battery) is integrated with a surface of interest (e.g., a metal surface). In some embodiments, a thin, conformal layer of an energy storage device (e.g., a battery) is integrated with a part or a whole area of the surface of interest (e.g., a metal surface). In some embodiments, the charged energy storage device (e.g., battery) keeps the surface in a state of constant negative potential, thereby protecting it from corrosion. In some embodiments, energy conversion storage devices (e.g., solar cells, thermoelectrics or piezoelectrics) can be used to recharge the energy storage device (e.g., battery). Therefore, in some embodiments, the methods of the present disclosure provide a combination of energy storage-conversion hybrid that can effectively provide round-the-clock corrosion protection without the need for external intervention.

In some embodiments, the components of a multilayer energy storage device can be chosen based on the electric potential required for cathodic protection of a desired surface. In some embodiments, voltage regulation devices may be used to set required electric potentials of multilayer energy storage devices. In some embodiments, the negative terminal (current collector) surface of a multilayer energy storage device (e.g., a battery) is in direct contact with a surface (e.g., a metal surface). In some embodiments, the positive terminal (current collector) of the multilayer energy storage device (e.g., battery) is grounded. In some embodiments, the negative terminal of an energy conversion device (e.g., a solar cell) is connected to the negative terminal of the multilayer energy storage device (e.g., battery) and therefore also connected to the surface (e.g., metal surface). In such embodiments, the positive terminal of the energy conversion device (e.g., solar cell) is connected to the positive terminal of the battery.

In more specific embodiments, a battery can be directly coated conformally on a metal surface by a multi-step spray-deposition method involving spray deposition of different component layers from specifically designed paints/suspensions of component materials. Alternatively, other deposition methods such as screen printing and inkjet printing may also be used.

In further embodiments, a thin, flexible battery may be created by deposition of component layers on a metal foil or a metal tape, such as a copper foil. The copper foil acts as the negative current collector of the thin, flexible battery. The resultant device, when packaged, will have the bottom surface of the copper foil exposed. Such a battery can be integrated with any desired surface with a conducting adhesive to achieve a similar corrosion protection behavior.

In additional embodiments, an energy conversion device (e.g., a solar cell) may be integrated with the battery. The solar cell can then charge the battery when exposed to light. During the day, the solar cell-battery hybrid will provide the cathodic protection. At night or in overcast conditions, the battery alone will provide the cathodic protection.

In some embodiments where various surfaces may be exposed to extreme heat, a thermally insulated packaging may be associated with the multilayer energy storage device or the energy conversion device. For instance, a thermally insulating packaging may be placed on the top of a battery or on the top of infrared reflectors.

Applications and Advantages

The methods of the present disclosure can find many applications. For instance, in some embodiments, the methods of the present disclosure can be used for corrosion prevention of large-area metallic surfaces that are exposed to corrosive environments. Examples of such surfaces include, without limitation, ships, oil rigs, chemical plants, bridges, construction and mining equipment, and the like.

Such applications provide various advantages. In particular, conventional cathodic protection methods require significant user intervention and maintenance. Moreover, protection of small and large equipment in areas that are not immediately accessible provides further challenges. The methods of the present disclosure address the above problems by providing multilayer energy storage devices that can be directly integrated with a surface to be protected. Furthermore, the energy storage devices can be charged with an integrated energy conversion device (e.g., solar cell) to provide round-the-clock corrosion prevention without need of significant user intervention or maintenance.

Furthermore, the methods of the present disclosure can be used to produce tape-like multilayer energy storage and conversion devices (e.g., battery-solar cell hybrid "roll tapes", as shown in FIG. 3) that can be used to protect any desired surface. This would allow retrofitting any existing equipment with the integrated cathodic protection device, as well as allow temporary protection of any equipment by use of a simple adhesive tape.

Outside corrosion prevention, the methods of the present disclosure can also be applied for energy conversion and storage on remote surfaces. For instance, the methods of the present disclosure can be used to provide illumination. The methods of the present disclosure can also be used to drive sensors in wireless sensor networks and small actuators. In such applications, the methods of the present disclosure will also provide intervention-free and maintenance-free advantages.

The methods of the present disclosure can also be cost effective. For instance, conventional cathodic protection methods rely on heavy duty batteries, such as lead-acid batteries. In some embodiments, use of Li-ion batteries based on aqueous electrolytes (instead of organic electrolytes) in accordance with the methods of the present disclosure could significantly reduce the costs of cathodic protection.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

In some embodiments, an important advantage of the methods of the present disclosure is the ability to directly integrate a battery with objects made of different materials such as metals, glass and ceramics. In the Examples set forth herein, a Li-ion battery is integrated with surfaces of metals such as iron, steel, copper, aluminum, titanium, and the like. As described in Examples 1-2, a battery is fabricated directly on a metal surface by spray-fabrication and directly integrated with the metal surface, where the negative electrode (i.e., anode) of the cell is in direct contact with the metal surface, as shown in FIGS. 7 and 10. The positive electrode of the integrated cell can be connected to the environment, for example by grounding. In such a configuration, the negative electrode in contact with the metal surface maintains a minimum negative potential on the surface with respect to the environment. As shown in FIGS. 2 and 8, the negative potential on the metal surface provides cathodic protection and helps prevent corrosion.

Furthermore, a thin, large-area battery can be easily integrated with large-area energy capture/conversion devices, such as solar cells. For example, a solar cell may be connected to the Li-ion cell shown in FIG. 8. In such a configuration, the solar cell will charge the battery when exposed to light. During the day, the electric potential generated by the solar cell, coupled with the battery, will provide cathodic protection to the metal surface. In overcast conditions or at night, the integrated battery alone can keep the surface negatively charged and provide the necessary cathodic protection.

Alternatively, thin, flexible batteries may be produced by spray fabrication or by conventional coating methods on a metal foil, such as a copper foil. Further, such thin, flexible batteries can be integrated with solar cells to produce battery-solar cell hybrid devices. Such hybrid devices can be produced in the form of a roll, such that a desired area of roll can be conveniently cut and integrated onto a metal surface by using a conductive adhesive. See FIG. 2 and Example 3. This will have a similar effect as integrating a battery directly with a surface, as described in Example 2 and FIGS. 9 and 10.

For example, a solar cell may be integrated with the battery deposited directly on the metal surface, as illustrated in FIGS. 2 and 7. Alternatively, solar cells may also be integrated with the thin, flexible batteries and the entire assembly can be produced in a roll-to-roll fashion, as illustrated in FIG. 3.

EXAMPLE 1

Preparation of Paints

The slurries or "paints" of electrode materials, current collector materials and polymeric separator materials can be prepared by various methods. See, e.g., N. Singh et. al, Scientific Reports 2, Article number: 481. (http://www.nature.com/srep/2012/120628/srep00481/full/srep00481.html). Also See PCT/US2013/032394, entitled "Methods of Making Multilayer Energy Storage Devices", filed on Mar. 15, 2013.

EXAMPLE 2

Fabrication of Cells by Direct Integration of a Battery with a Metallic Surface

The negative electrode (−ve) current collector layer is first deposited by spraying the current collector paint upon an appropriate substrate heated to temperatures between 50° C.-140° C. The negative electrode electrode paint is sprayed upon the current collector layer at a controlled rate to form an electrode layer at a desired thickness. An optional calendaring (compaction) step may be performed at this stage. The polymer separator layer is then deposited onto the electrode layer. Alternatively, a pre-fabricated polymer separator may also be used. Next, a positive electrode paint is sprayed onto the polymer separator layer at a controlled rate to achieve a desired thickness. A positive electrode current collector layer is then spray deposited. An optional calendaring (compaction) step may be performed at this stage. The cell is then activated by addition of electrolyte and sealed in an appropriate packaging material.

EXAMPLE 3

Production of Roll-to-Roll Modular, Thin, Flexible Batteries

An appropriate metal foil, such as a copper foil, is used as the negative electrode current collector. The steps in Example 2 are repeated. The batteries are fabricated in a roll-to-roll process to fabricate a roll of thin, flexible batteries. The batteries are divided into units of convenient sizes that can be detached and used. A conductive adhesive is applied to the back surface of the copper foil and an appropriate protective layer (similar to adhesive stickers) that can be peeled off is applied to the back surface.

EXAMPLE 4

Integration of Energy Conversion Devices

A solar cell is integrated with the battery formed in Example 2 by directly depositing the solar cell on the surface of the formed battery. An adhesive may be utilized. In some embodiments, a thermal insulation layer may be placed between the battery and the solar cell. Appropriate electrical connections can then be made between the battery and the solar cell.

A solar cell can also be integrated with the battery formed in Example 3 through a roll-to-roll fashion. For instance, the protective layer on the back of the copper foil in Example 3 can be removed to expose the adhesive layer. The solar cell may then be adhered to the adhesive layer. An adhesive may also be used. Appropriate electrical connections can then be made between the battery and solar cell.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of protecting a metal surface from corrosion, said method comprising:
    conformably attaching a hybrid device directly onto the metal surface,
        wherein the hybrid device comprises at least one energy storage device and at least one energy conversion device,
        wherein the energy storage device is a multilayer energy storage device, and
    wherein the multilayer energy storage device is formed by a process comprising the steps of:
        applying a first layer comprising a non-solid current collector composition to the metal surface to form a negative electrode current collector layer above the metal surface;
        applying a second layer comprising a first non-solid electrode composition to the negative electrode current collector layer to form a negative electrode layer above the negative electrode current collector layer;
        applying a non-solid electrically insulating composition above the negative electrode layer to form an electrically insulating layer above the negative electrode layer;
        applying a second non-solid electrode composition above the electrically insulating layer to form a positive electrode layer above the electrically insulating layer; and
        applying a second non-solid current collector composition above the positive electrode layer to form a positive electrode current collector layer above the positive electrode layer, and
    wherein the negative electrode current collector of the energy storage device is in direct contact with the metal surface.

2. The method of claim 1, wherein the hybrid device is mechanically flexible.

3. The method of claim 1, wherein the hybrid device is mechanically rigid.

4. The method of claim 1, wherein the hybrid device is a single unit comprising at least one energy conversion device and at least one energy storage device.

5. The method of claim 4, wherein the at least one energy conversion device and the at least one energy storage device are combined in a monolithic unit.

6. The method of claim 4, wherein the at least one energy conversion device and the at least one energy storage device are combined by physical attachment using adhesion, epoxies, mechanical means or combinations thereof.

7. The method of claim 4, wherein at least one of an isolating layer is placed between the energy conversion device and energy storage device.

8. The method of claim 7, wherein the isolating layer comprises an electrically insulating layer, thermally insulating layer, vibration resistant layer or combinations thereof.

9. The method of claim 7, wherein the isolating layer is attached to at least one energy conversion device and at least one energy storage device by physical attachment using adhesion, epoxies, mechanical means or combinations thereof.

10. The method of claim 1, wherein the energy storage device is selected from the group consisting of capacitors, supercapacitors, batteries, hybrids and combinations thereof.

11. The method of claim 1, wherein the energy conversion device is selected from the group consisting of solar cells, thermoelectrics, piezoelectrics, and combinations thereof.

12. The method of claim 1, wherein a positive electrode of the energy storage device is in electrical contact with the environment.

13. The method of claim 12, wherein the positive electrode of the energy storage device is grounded.

14. The method of claim 1, wherein a negative electrode of the energy conversion device is electrically connected to the negative electrode of the energy storage device and a positive electrode of the energy conversion device is electrically connected to a positive electrode of the energy storage device.

15. The method of claim 14, wherein the electrical connections comprise electrically conducting wires.

16. The method of claim 1, wherein the metal surface is mechanically flexible.

17. The method of claim 1, wherein the metal surface is mechanically rigid.

18. The method of claim 1, wherein the metal surface is electrically conducting.

19. The method of claim 1, wherein the second layer is applied to the negative electrode current collector layer multiple times to form a plurality of negative electrode layers above the negative electrode current collector layer.

20. The method of claim 1, wherein the first layer is applied to the metal surface multiple times to form a plurality of negative electrode current collector layers above the metal surface.

21. The method of claim 1, wherein the non-solid electrically insulating composition is applied to the negative electrode layer multiple times to form a plurality of electrically insulating layers above the negative electrode layer.

22. The method of claim 1, wherein the second non-solid electrode composition is applied to the electrically insulating layer multiple times to form a plurality of positive electrode layers above the electrically insulating layer.

23. The method of claim 1, wherein the second non-solid current collector composition is applied to the positive electrode layer multiple times to form a plurality of positive electrode current collector layers above the positive electrode layer.

24. A method of protecting a metal surface from corrosion, said method comprising:
conformably attaching a hybrid device directly onto the metal surface,
wherein the hybrid device comprises at least one energy storage device and at least one energy conversion device,
wherein the energy storage device is a multilayer energy storage device, and wherein the multilayer energy storage device is formed by a process comprising the steps of:
applying a first non-solid electrode composition to the metal surface to form a negative electrode layer above the metal surface;
applying a non-solid electrically insulating composition to the negative electrode layer to form an electrically insulating layer above the negative electrode layer;
applying a second non-solid electrode composition to the electrically insulating layer to form a positive electrode layer above the electrically insulating layer; and
applying a non-solid current collector composition above the positive electrode layer to form a positive electrode current collector layer above the positive electrode layer, and
wherein the negative electrode of the energy storage device is in direct contact with the metal surface.

25. The method of claim 24, wherein the first non-solid electrode composition is applied to the metal surface multiple times to form a plurality of negative electrode layers above the metal surface.

26. The method of claim 24, wherein the non-solid electrically insulating composition is applied to the negative electrode layer multiple times to form a plurality of electrically insulating layers above the negative electrode layer.

27. The method of claim 24, wherein the second non-solid electrode composition is applied to the electrically insulating layer multiple times to form a plurality of positive electrode layers above the electrically insulating layer.

28. The method of claim 24, wherein the non-solid current collector composition is applied to the positive electrode layer multiple times to form a plurality of positive electrode current collector layers above the positive electrode layer.

29. The method of claim 1 or 24, wherein one or more of the applying steps are selected from the group consisting of spraying, brushing, rolling, printing, and combinations thereof.

30. The method of claim 24, further comprising a step of activating the formed multi-layer energy storage device.

31. The method of claim 30, wherein the activating step comprises addition of an electrolyte to the formed multi-layer energy storage device.

* * * * *